(12) United States Patent
Kranitzky

(10) Patent No.: US 6,487,695 B1
(45) Date of Patent: Nov. 26, 2002

(54) METHOD FOR PROVIDING FAIL-SAFE SECURE DATA TRANSMISSION BETWEEN A NUMERICAL CONTROL SYSTEM AND A SPATIALLY SEPARATE UNIT

(75) Inventor: Walter Kranitzky, Traunstein (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 0 days.

(21) Appl. No.: 09/364,797

(22) Filed: Jul. 30, 1999

(30) Foreign Application Priority Data

Aug. 1, 1998 (DE) .......................... 198 34 863

(51) Int. Cl.[7] .......................... G06F 11/00; H03M 13/00
(52) U.S. Cl. .......................... 714/800; 700/86; 700/180
(58) Field of Search ........... 700/86, 180; 318/600–602, 318/638, 565, 675; 714/777, 800; 375/222, 326, 327, 240.26

(56) References Cited

U.S. PATENT DOCUMENTS

| 4,228,495 A | * 10/1980 | Bernhard et al. ........... 364/136 |
| 4,636,938 A | * 1/1987 | Broome ....................... 364/191 |
| 5,687,103 A | * 11/1997 | Hagl et al. .................. 702/150 |

FOREIGN PATENT DOCUMENTS

| DE | 82 36 366 | 6/1983 | ........... G05B/19/18 |
| DE | 37 18 585 | 12/1987 | ........... G05B/9/02 |
| DE | 35 33 849 | 10/1995 | ........... G05B/9/03 |
| DE | 36 10 620 | 3/1996 | ........... B60T/8/32 |
| DE | 3610620 | * 3/1996 | ........... B60T/8/32 |
| DE | 297 10 026 | 6/1997 | ......... G05B/19/425 |
| EP | 0 352 759 | 1/1990 | ............ G05D/1/00 |
| EP | 0 399 308 | 11/1990 | ........... G06F/11/16 |
| EP | 0 182 134 | 2/1992 | ........... G06F/11/00 |
| EP | 0 742 500 | 11/1996 | ......... G05B/19/042 |
| EP | 0742500 | * 11/1996 | ......... G05B/19/042 |
| EP | 0742505 | * 11/1996 | ....... G05B/19/4063 |
| EP | 0 742 505 | 11/1996 | ......... G05B/9/4063 |

OTHER PUBLICATIONS

Kenneth Sherman (Data Communications, A User's Guide, 1981, pp. 2–5, 151–156).*
European Search Report No. 99113908.0 dated Nov. 17, 1999.
Sicherheit von Maschinen Sicherheitsbezogene Teile von Steuerungen Teil 1: Allgemeine Gestaltungsleitsätze Deutsche Fassung prEN 954–1 : 1992*.
Prozesssicherheit mit parallelen Systemen, , D. Dietrich, W. Kessel, W. Konhäuser, elektrotechnik, 66, H. 5, Mar. 19, 1984, p. 20–22 and 25 **.

* cited by examiner

Primary Examiner—Albert Decady
Assistant Examiner—Guy Lamarre
(74) Attorney, Agent, or Firm—Kenyon & Kenyon

(57) ABSTRACT

A fail-safe system to connect a mobile input unit with a machine control unit, implementing a redundant preprocessing of the user inputs in the mobile input unit. The signals from the input means are routed to two processors of the input unit, and both processors encode the user inputs before transmitting the signals to the control unit. In the control unit, the received and encoded user inputs are decoded by two processors and subsequently compared to one another for concordance. When concordance is given, the received data is further processed in the control. If there is no concordance, an error routine is executed, shutting down the machine tool.

10 Claims, 1 Drawing Sheet

METHOD FOR PROVIDING FAIL-SAFE SECURE DATA TRANSMISSION BETWEEN A NUMERICAL CONTROL SYSTEM AND A SPATIALLY SEPARATE UNIT

The present invention relates to a method for providing fail-safe data transmission between a numerically controlled machine and a spatially separate controller unit. In particular, the invention relates to high speed fail-safe data transmission between a numerically controlled machine and a spatially separate controller unit.

DESCRIPTION OF RELATED ART

It is known, for example from German Utility Model Patent G 82 36 366.8, that machine tools can be equipped not only with an operator's panel, but also with a supplemental, mobile wrist-extension manipulator device used to remotely control certain special functions of the machine. The operator's panel usually includes a display device from which the user is able to initiate and monitor all functions for controlling the machine. The mobile wrist-extension device can include an electronic handwheel operating a manual pulse generator, that enables the user to enter, for example, the movement commands for one or more axes of the machine not only when the user is at the operator's panel but in a more limited manner from any other location. The mobile wrist-extension device of this patent has various keys for selecting functions, and a rotary position transducer operated by a handwheel. A cable having the requisite lines for signal transmission provides the link between the wrist-extension device and the controller of the machine, but this patent does not reveal a method for reliably transmitting input data from the wrist-extension device to the controller.

The German Patent 29710 026 describes a numerical control system having a spatially separate operator panel, which includes a handwheel for inputting position control commands. In this patent, the positioning commands are transmitted from the spatially separate operator panel to the system controller within a fixed time grid, using a wireless transmission device in accordance with the DECT standard. There is no mechanical link, such as a cable, between the system controller and the operator panel.

The drawback of this specific system is that it is easily disturbed by the electromagnetic fields present in a machine room. Therefore, when using the operator panel, there is the constant danger of the machine malfunctioning not only due to failure of electronic modules, but also due to interference with the radio transmission of commands.

Guidelines exist with respect to the requirements for fail-safe and fault-tolerant systems, in particular control systems. EN 954-1 stipulates that a category-3 fail-safe system must not enter into an unpredictable operating state because of one single fault, but rather that it continue to function as a fail-safe system in spite of the single fault. In cases where the system's input unit is separate from the system's control unit, the data transmission between the controller and the input unit also should include a fail-safe transmission method, to attain a fully fail-safe system. A variety of conventional transmission methods have been used toward this goal. For example, in one possible fail-safe transmission method, the input data received in the controller unit is retransmitted to the input unit, and compared there to the input data originally sent to the controller unit. If concordance between the signals is recognized, then no error has occurred during transmission, otherwise the error is communicated to the controller unit by the input unit, thereby requiring a renewed data transmission.

The disadvantage of this method is that it is necessary for data to be transmitted both by the input unit as well as by the controller, making it necessary to provide transmitting/receiving modules both in the input unit as well as in the controller. In addition, the controller must wait until it is certain that the input unit is no longer reporting any errors with respect to the input data. This leads to a delay in the processing of input data. A further disadvantage of this method is that if an error first occurs during retransmission of the input data from the controller unit to the input unit, the system will interpret the resulting lack of concordance as a faulty transmission from the input unit to the controller, and initiate an error routine.

Another approach is described in EP 182 134 BI for operating a multi-computer system which is fail-safe in terms of signal engineering, and is used in particular for railway safety installations. As soon as interferences are recognized in this multi-computer system, so-called "long telegrams" for the data exchange are transmitted between the computers. A feature of these long telegrams is that they are made up of two telegrams having the same content and standardized length, and that they are transmitted over transmission channels that have not been recognized as being interfered until that point in time. As a result, the data transmission is characterized by higher redundancy. In this context, one of the two customary telegrams can be transmitted as inverted telegrams. The drawback of this method is that a long telegram is produced and transmitted by one single computer. Therefore, it is not possible to detect disturbances affecting only one computer.

SUMMARY OF THE INVENTION

The present invention is directed to a method for providing fail-safe data transmission between a numerically controlled machine and a spatially separate input unit that substantially obviates one or more of the problems due to limitations and disadvantages of the related art, and that provides high speed transmission of data. Additional features and advantages of the invention will be set forth in the description which follows, and in part will be apparent from the description, or may be learned by practice of the invention. The objectives and other advantages of the invention will be realized and obtained by the apparatus and method particularly pointed out in the written description and claims hereof, as well as the appended drawings.

To achieve these and other advantages and in accordance with the purpose of the invention, as embodied and broadly described, the invention is a method for a most rapid possible data transmission between the machine controller and input unit which requires as little additional outlay as possible to render the data transmission fail-safe.

The method for providing fail-safe transmission of data between a numerically controlled device and a spatially separate input unit includes providing the data to at least two input processors of the input unit, which are independent of one another, encoding the data in the at least two input processors of the input unit using different encoding algorithms in each of the at least two input processors, and transmitting the encoded data from the least two input processors to a controller of the device. Next, the method includes providing the encoded data to at least two control processors, corresponding to each of the at least two input processors, decoding the encoded data in the at least two control processors of the controller, using different decoding algorithms that are the inverse of the different encoding algorithms, and checking the decoded data for parity, so an error routine can be executed in response to a result of non-parity.

In another embodiment, the invention further comprises transmitting the encoded data from a second input processor to a first input processor of the input unit, transmitting a unitary message containing the encoded data of the first and second input processors from the first input processor, via an interface, to a first control processor of the controller, and routing one of the encoded data of the first and second input processors to a second control processor of the controller.

An advantage of the method according to the present invention is that a fail-safe data transmission is implemented between the input unit and the machine controller in an especially simple manner. The input commands entered by the user are variably coded independently of one another by the two processors of the input unit, and are transmitted in succession to the machine controller. Existing data transmission paths are used in the controller without any danger of unauthorized altering of the transmission data. An especially high degree of fail-safeness is advantageously achieved if codes for safeguarding against errors are used to encode the messages.

It is to be understood that both the foregoing general description and the following detailed description are exemplary and explanatory and are intended to provide further explanation of the invention as claimed.

BRIEF DESCRIPTION OF THE DRAWING

The accompanying drawing is included to provide a further understanding of the invention and is incorporated in an constitute part of the specification, illustrates an embodiment of the invention and together with the description serves to explain the objects, advantages, and principles of the invention.

The drawing is a diagram showing one embodiment of the data transmission system according to the invention, having one input unit which transmits user inputs to a machine controller.

DETAILED DESCRIPTION OF THE EMBODIMENTS

Figure 1:
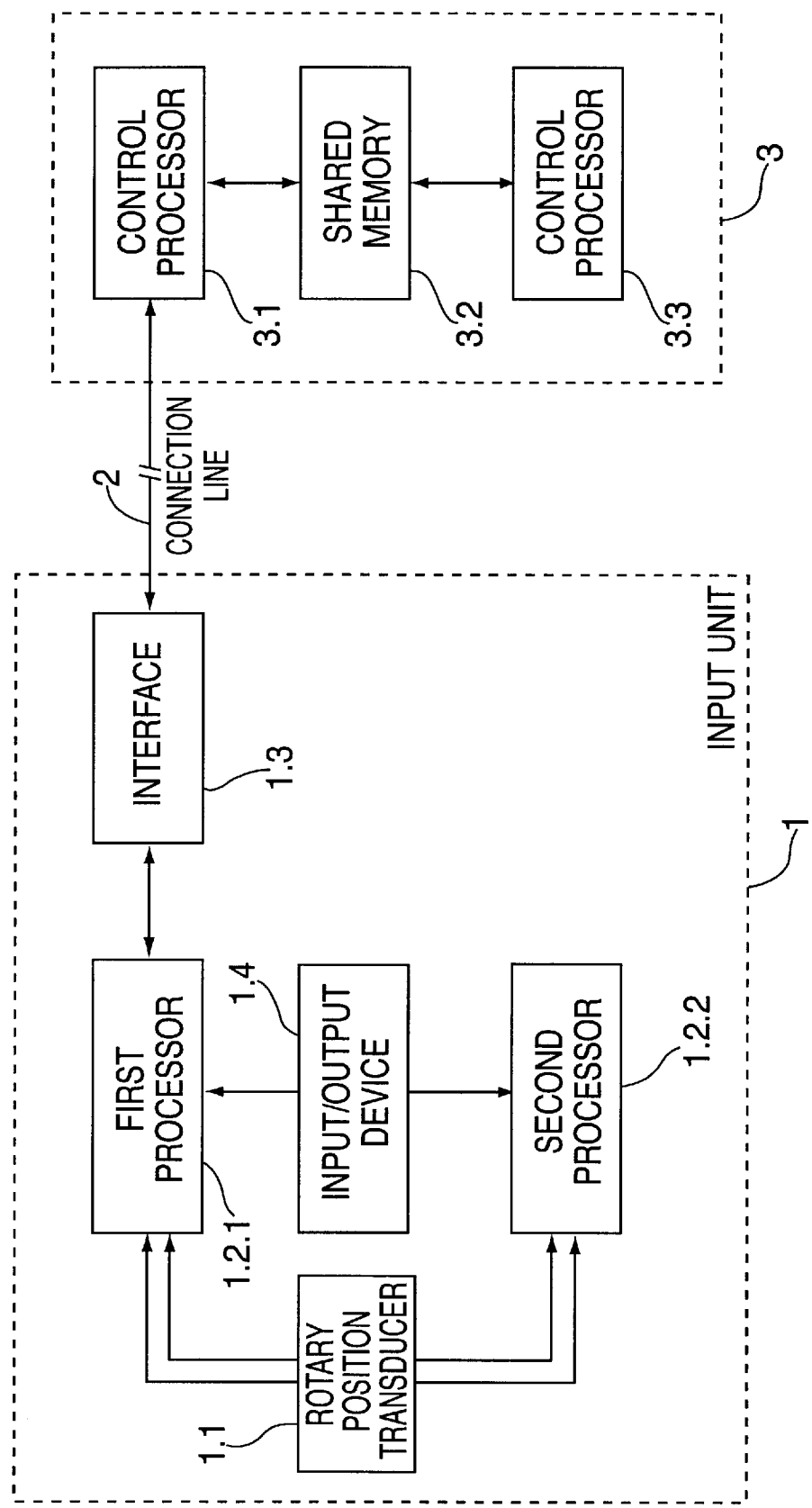

The present invention shall be explained in the following description on the basis of a preferred exemplary embodiment. The spatially separate input unit is shown as an input unit 1. The drawing illustrates an example of one possible implementation of the electrical circuit of input unit 1. A first processor 1.2.1 is linked to a rotary position transducer 1.1 and to other input modules such as an input/output device 1.4 which can include, for example, an emergency-off key. Processor 1.2.1 is also linked to an interface 1.3. Provision is also made for a second processor 1.2.2, which is likewise linked to the rotary position transducer 1.1, to the input/output device 1.4, and to first processor 1.2.1. Interface 1.3 is connected via a line 2 to a machine controller 3. Line 2 could be a cable or a wireless connection. Encoded data may be transmitted from the input unit over one single multiplex line, and one of time-, code-, and frequency-multiplexing may be used in transmitting the encoded data to a machine controller 3. Machine controller 3 includes a first control processor 3.1, a second control processor 3.3, and a memory 3.2 shared by the two control processors 3.1 and 3.3.

Input/output device 1.4 includes a number of function keys, in particular an emergency-off key, as well as various switches for carrying out necessary user inputs. In addition, in a preferred embodiment this module can have optical and/or acoustical signaling means, such as light-emitting diodes, a display screen and/or a voice response, to acknowledge the inputs to the user or to indicate selected operating states. If current operating states of machine controller 3 are also displayed, then it is necessary to also provide additional modules needed for a data transmission from machine controller 3 to input unit 1. In a preferred embodiment, a handwheel having a rotary position transducer 1.1 is provided to the user for inputting command signals. Commands affecting axial movements of the controlled machine are preferably input by the operator using the handwheel of position transducer 1.1.

During operation the data containing all user commands is fed, for example, from rotary position transducer 1.1 and input/output device 1.4 to both input processors 1.2.1 and 1.2.2. The user commands are checked for concordance by both input processors 1.2.1 and 1.2.2. Thus, performance reliability is enhanced by a two-way monitoring of the user commands by the two processors 1.2.1 and 1.2.2.

To facilitate monitoring of the link between machine controller 3 and input unit 1 and to ascertain if interference exists in connection line 2, it is possible to apply various measures to ensure a high level of transmission reliability.

In accordance with the present invention, the user commands in the form of output signals from rotary position transducer 1.1 and input/output device 1.4 are encoded using various known encoding algorithms in both input processors 1.2.1 and 1.2.2. In a preferred embodiment, each processor only utilizes one encoding algorithm, which is specific to that processor. In this manner, each of the processors 1.2.1 and 1.2.2 produces a different digital transmission containing the encoded user commands, by starting from identical user commands and using different encoding algorithms. These transmission containing the encoded data are inserted into a specific transmission protocol and transmitted via line 2 to machine controller 3. In another embodiment, more than 2 input processors can be used, preferably with a corresponding number of control processors.

In a preferred embodiment, the encoding algorithms are algorithms that produce an especially well encrypted code and/or a substantially fail-safe code. For example, CRC codes, Hamming codes, or simple horizontal check sums can be used as fail-safe codes. To a certain extent, these encoding algorithms also result in an encryption of the signal.

During transmission, the digital transmission data of input processor 1.2.2 is sent to input processor 1.2.1, and together with the digital transmission data of processor 1.2.1 a transmission protocol that is transmitted via interface 1.3 and line 2 to control processor 3.1 of machine controller 3. Control processor 3.1 recognizes the portion of the transmission protocol addressed to itself, and the portion addressed to control processor 3.3.

This recognition can be made, for example, based on the order of the digital transmission data in the transmission protocol. In a preferred embodiment, it can be stipulated that the first half of the transmission data received by control processor 3.1 is intended for control processor 3.3, while the second half of the received transmission data is intended for control processor 3.1. The opposite situation would be equivalent, with the first half of the transmission intended for control processor 3.1 Alternatively, the recognition can also be made based on identification and tagging of the transmission data, which can be carried out either by input processor 1.2.1, or by input processor 1.2.2, or even by both processors in input unit 1. In either situation, control processor 3.1 routes the portion of transmission data intended for control processor 3.3 to this destination unchanged.

Machine controller 3 includes the two control processors 3.1 and 3.3, where a first decoding algorithm is stored in a first processor 3.1, and a second different decoding algorithm is stored in a second processor 3.3. In a preferred embodiment, the encoding performed by the first encoding algorithm in first input processor 1.2.1 of input unit 1 and the encoding performed by the second encoding algorithm in second input processor 1.2.2 of input unit 1, are respectively decoded by control processors 3.1 and 3.3 of machine controller 3. In accordance with the present invention, the first encoding algorithm is exclusively known to the first input processor 1.2.1 of input unit 1. Similarly, a first decoding algorithm that is the inverse of the first encoding algorithm is exclusively known to the first control processor 3.1 in machine controller 3. In a similar manner, the second encoding algorithm, and the corresponding second decoding algorithm are exclusively known to the second input processor 1.2.1 in input unit 1, and to the second control processor 3.3 in controller 3, respectively.

After the portions of the received message are decoded by the respective control processors, the two control processors 3.1 and 3.3 of machine controller 3 compare their individual copy of the decoded digital transmissions received from the input unit 1 for parity. In this step, the decoded user commands are exchanged via shared memory 3.2. Both control processors 3.1 and 3.3 write the decoded user commands into a main memory area, specific to each control processor, of shared memory 3.2. Subsequently each control processor reads out the user commands decoded by the other processor from the area of main memory of shared memory 3.2 allocated to the other control processor. Then, both control processors 3.1 and 3.3 compare the user commands from the other control processor to their own version of the decoded user commands to check for parity, meaning to determine if the two messages are identical. In the case of non-parity, a transmission error is determined to have occurred.

In a different embodiment, memory 3.2 is not absolutely essential. For example, the decoded user commands can also be exchanged directly between control processors 3.1 and 3.3, that then carry out the comparison as explained above.

If a transmission error is recognized, an error routine is executed by machine controller 3. When this occurs, according to a preferred embodiment, all drives of the machine are shut down by control processors 3.1 and 3.3 over two channels, so that no machine components are able to move. Furthermore, an error message indicative of the faulty data transmission between input unit 1 and machine controller 3 is output to the user.

In a further embodiment according to the invention, several input units and machines having a controller module can be used alternatively or additionally to the basic one transmitter-one receiver pair, using the described manner of providing fail-safe data transmission. To utilize the system according to the invention it is merely necessary that the input units and the machine controllers communicating with each other have each two independent processors. This condition is usually fulfilled anyway, because redundant processors provide the fail-safeness increasingly required of control systems. Data transmission is carried out between the control processors 3.1 and 3.3 of additional machine controllers and the two input processors 1.2.1, 1.2.2 that are placed in any component of the entire numerical control system for the machine, in the same manner described with the respect to input unit 1 and controller unit 3.

It will be apparent to those skilled in the art that various modifications and variations can be made in the structure and the methodology of the present invention, without departing from the spirit or scope of the invention. Thus, it is intended that the present invention cover the modifications and variations of this invention provided they come within the scope of the appended claims and their equivalents.

What is claimed is:

1. A method for providing fail-safe transmission of data between a numerically controlled device and a spatially separate input unit, comprising:

providing the data to at least two input processors of the input unit, which are independent of one another;

encoding the data in the at least two input processors of the input unit using different encoding algorithms in each of the at least two input processors;

transmitting the encoded data from the at least two input processors to a machine controller of the device;

providing the encoded data to at least two control processors, corresponding to each of the at least two input processors;

decoding the encoded data in the at least two control processors, using different decoding algorithms that are the inverse of the different encoding algorithms; and checking for parity the decoded data and executing an error routine in response to a result of non-parity.

2. The method as recited in claim 1, wherein the encoded data is transmitted from the input unit over one single multiplex line.

3. The method as recited in claim 2, wherein one of time-, code-, and frequency-multiplexing is used for transmitting the encoded data to the machine controller.

4. The method as recited in claim 1, wherein the transmitting step further comprises:

transmitting the encoded data from a second input processor to a first input processor of the input unit;

transmitting a message containing the encoded data of the first and second input processors from the first input processor via an interface to a first control processor of the machine controller; and routing a portion of the message corresponding to the encoded data from one of the first and second input processors to a second control processor of the machine controller.

5. The method as recited in claim 4, further comprising routing another portion of the message corresponding to the encoded data from another one of the first and second input processors to the first control processor.

6. The method as recited in claim 4, further comprising tagging prior to transmission a portion of the message for routing to one of the first and second control processors.

7. The method as recited in claim 1, wherein the encoding in the at least two input processors comprises an encryption and/or a fail-safe step.

8. The method as recited in claim 7, wherein the encryption step uses one of a CRC code, a Hamming code, and an horizontal check sum.

9. The method as recited in claim 1, wherein the error routine comprises shutting down the numerically controlled device by the at least two control processors over two channels, and outputting an error message.

10. The method as recited in claim 1, wherein the data is provided to two input processors and the encoded data is provided to two control processors.

* * * * *